INVENTOR
GEORG SCHORP
BY Nolte & Nolte
ATTORNEYS

Aug. 13, 1968 G. SCHORP 3,396,591
INFINITELY VARIABLE MECHANICAL SPEED TRANSMISSION
Filed Feb. 18, 1966 2 Sheets-Sheet 2

INVENTOR
GEORG SCHORP

BY *Nolte & Nolte*

ATTORNEYS

United States Patent Office 3,396,591
Patented Aug. 13, 1968

3,396,591
INFINITELY VARIABLE MECHANICAL SPEED TRANSMISSION
Georg Schorp, Munich-Pasing, Germany, assignor to Bayerisches Leichtmetallwerk Graf Blucher Von Wahlstatt KG, Munich, Germany
Filed Feb. 18, 1966, Ser. No. 528,634
Claims priority, application Germany, Feb. 19, 1965, B 80,604
1 Claim. (Cl. 74—230.17)

ABSTRACT OF THE DISCLOSURE

A pulley transmission of infinitely variable speed. The pulley of the transmission is of the cone type and has a pair of cone sections which taper toward each other and which are axially adjustable with respect to each other for adjusting the transmission, as is well known.

Figure 1:
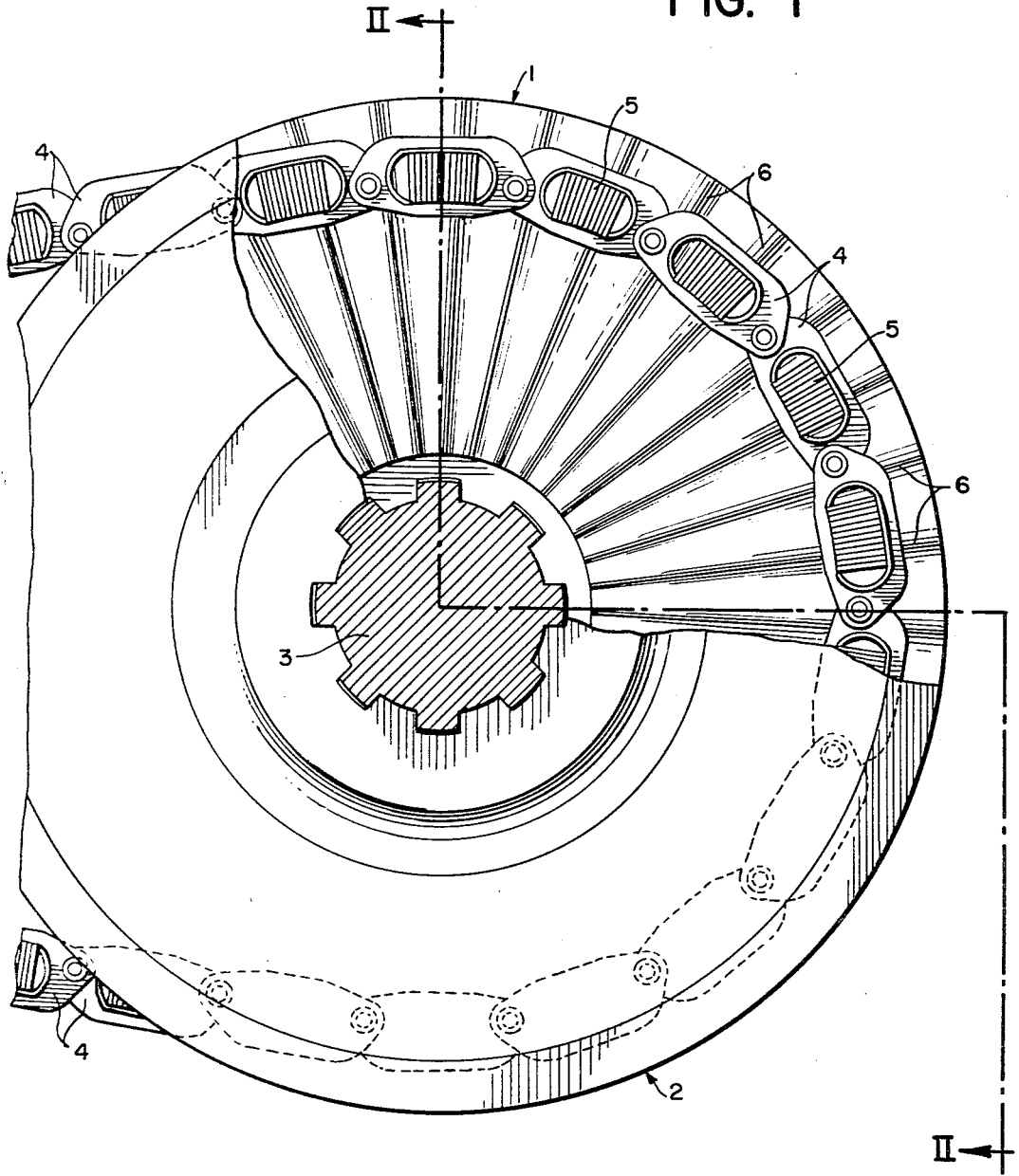

At their tapered surfaces which are directed toward each other the sections of the pulley are circumferentially corrugated and are defined at these spaces in their entirety by curved surfaces free of any sharp transition edges and composed in any circumferential section of arcs of circles which are arranged one after the other in reverse directions so that a convex surface portion is followed by a concave surface portion of the pulley which smoothly merges with the convex surface portion. Situated between the tapered corrugated pulley surfaces is a transmission chain having links respectively provided with group of transversely extending lamellae, and because the convex surface portions of one of the cone pulley sections are angularly aligned with the concave surface portions of the other cone pulley section, these lamellae will be transversely shifted preventing slippage between the transmission chain and pulley. As a result of the smooth transition between the curved surface portions of the cone pulley sections there are no sharp edges which will become rapidly worn out and there is relatively little if any slippage of the transmission. In addition, the cone pulley sections can be economically manufactured as simple forgings.

---

This invention relates to an infinitely variable mechanical speed transmission with two pairs of cone pulleys which are joined together by a chain with slidable transverse lamellas, a V-belt, or the like, the relative distance of the pulleys of the one pair being adjustable as a function of the relative distance of the pulleys of the other pair, and all cone pulleys being provided with radial profilings at the surface of their cones turned towards the chain, said profilings being arranged to permit the lamellas to interengage.

Known speed transmissions of the type designated above, such as for example so-called P.I.V. gears, are provided with pulleys the profilings of which have rectangular or trapezoidal cross-sectional areas. Accordingly said profilings have sharp edges with the effect that when the transformation ratio of the transmission gear is regulated the chain between the turning pairs of cone pulleys is shifted roughly and intermittently. Besides, this necessarily causes the sharp edges to wear out which consequently results in a slip of the transmission gear. Furthermore these cross-sectional areas of the cone pulley profilings cannot be manufactured by way of an economical forging process.

Thus it is the object of the present invention to provide an infinitely variable mechanical speed transmission whose cone pulleys can be economically produced by forging processes and whose transformation ratio is uniformly and smoothly variable in operation, thereby guaranteeing a minimum of wear of the cone pulley profiling.

This can be achieved in that the cross section of the profiling relative to the same radius of each cone pulley is limited by curves similar to one another and following an alternating principal direction.

A cone pulley of this type may be forged without difficulty in a die.

When using a laminated chain it can safely be avoided that the lamellas contained in the chain slide over the sharp edges of the cone pulleys in jerks.

When using a V-belt the power transmission may be increased by providing a larger contact surface.

The cross-sectional area of the profiling of the cone pulley shaped according to the invention preferably has the form of an arc of circle, the elevations of the profiling being formed as is commonly known, i.e. similar to one another and reduced towards the center of the cone pulley. Those parts of the cross-sectional area having the form of a circular arc may be connected by interposed straight lines. The cross-sectional area may also have the form of an involute at its outer range.

Figure 2:
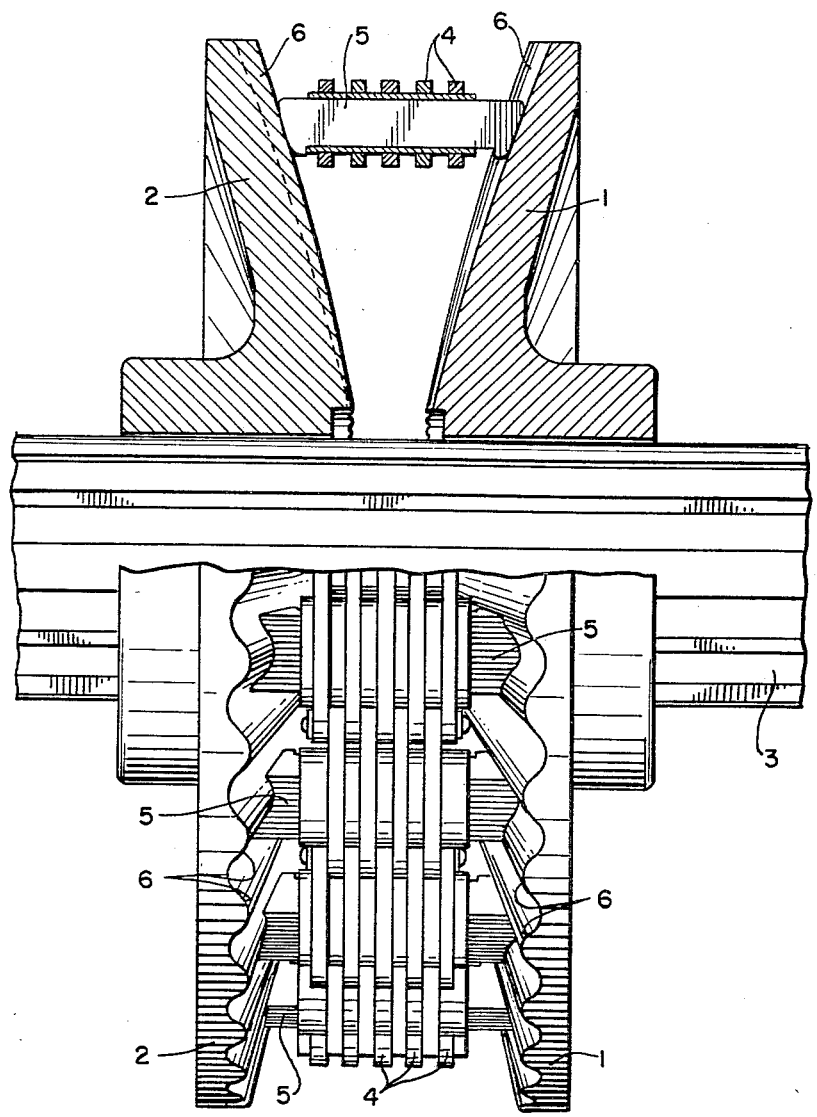

The invention will now be described by way of example with reference to the accompanying drawings, wherein:

FIGURE 1 is a view in axial direction of a cone pulley according to the invention; and FIGURE 2 is a sectional view of a pair of cone pulleys taken on the line II—II of FIGURE 1.

Referring to these figures more particularly, the reference numeral 1 indicates the cone pulley which together with the corresponding cone pulley 2 is mounted slidably but not turnably on the transmission shaft 3. The chain 4 disposed between the cone pulleys 1 and 2 is provided with a number of lamellas 5 which are arranged in groups and slidable to the side. The profiling 6 of the cone pulleys 1 and 2 is disposed at the conical side of the pulley directed towards the chain 4 and has a cross-sectional area of wave line shape. In the embodiment illustrated here this wave line is composed of circular arcs. The two pulleys 1 and 2 have the same profiles and are arranged with respect to one another in such a manner that a crest of the profile of one cone pulley matches the trough of the profile of the opposite cone pulley.

What I claim is:

1. For use in a pulley transmission of variable speed, a cone pulley having cone pulley sections which are coaxial and which are provided with surfaces which taper toward each other, said surfaces of said cone pulley sections being circumferentially corrugated and composed entirely of curved surface portions free of any sharp edges with each cone pulley section having in any circumferential section at said surface thereof equal convex and concave curved surface portions following one after the other and merging smoothly into each other so that the curvature of the surface of each cone pulley section repeatedly reverses itself circumferentially around said surface, and a transmission chain situated between and engaging said surfaces of said cone pulley sections, said chain having links each of which is provided with a group of transversely extending lamellae having ends engaging said surfaces, the convexly curved portions of the surface of one pulley section being angularly aligned with the concave surface portions of the other pulley section, so that said lamellae will be transversely shifted smoothly at said surfaces of said pulley sections substantially eliminating slippage and providing a smooth transmission of power between said chain and cone pulley sections, said corrugated tapered surfaces of said cone pulley sections which are directed toward each other being corrugated radially from the outer periphery of each cone pulley section all the way to the inner periphery thereof at a hub of said cone pulley section, with said curved surface portions providing smoothly curved ribs and grooves which are inclined at the surface of one pulley section toward the other pulley section and the depths of said grooves and the radii of said ribs gradually diminishing from the outer toward the inner periphery of each cone section.

References Cited

UNITED STATES PATENTS

| | | | |
|---|---|---|---|
| 765,173 | 7/1904 | Fay | 74—230.17 |
| 1,966,831 | 7/1934 | Oakes et al. | 74—230.17 |
| 3,175,410 | 3/1965 | Dittrich | 74—230.17 |

FOREIGN PATENTS

| | | |
|---|---|---|
| 591 | 3/1913 | Great Britain. |
| 1,193,000 | 10/1959 | France. |

FRED C. MATTERN, JR., *Primary Examiner.*

J. A. WONG, *Assistant Examiner.*